United States Patent

Duggirala et al.

[11] Patent Number: 5,872,316
[45] Date of Patent: Feb. 16, 1999

[54] IN-DIE EJECTION FORCE MEASUREMENT IN FORMING OPERATIONS

[75] Inventors: Ravi Duggirala, Saginaw, Mich.; Swavik A. Spiewak, Corvallis, Oreg.

[73] Assignee: National Center for Manufacturing Sciences, Ann Arbor, Mich.

[21] Appl. No.: 953,357

[22] Filed: Oct. 17, 1997

Related U.S. Application Data

[60] Provisional application No. 60/030,402 Oct. 21, 1996.
[51] Int. Cl.$^6$ ........................................... G01N 3/00
[52] U.S. Cl. ................................. 73/768; 73/769
[58] Field of Search .................. 73/763, 768, 769

[56] References Cited

U.S. PATENT DOCUMENTS

| | | | |
|---|---|---|---|
| 3,395,564 | 8/1968 | Rastrelli et al. | 73/768 |
| 4,412,456 | 11/1983 | Wilhelm et al. | 73/768 |
| 4,466,477 | 8/1984 | Alofs | 164/150 |
| 4,484,480 | 11/1984 | Mucheyer | 73/768 |
| 5,363,899 | 11/1994 | Takagi et al. | 164/113 |
| 5,377,548 | 1/1995 | Ballivy | 73/768 |

*Primary Examiner*—Max H. Noori
*Attorney, Agent, or Firm*—Gifford, Krass, Groh, Sprinkle, Patmore, Anderson & Citkowski

[57] ABSTRACT

The measurement of ejection tonnage in a die in forming process uses an embedded, in-die sensor and signal filtering methods for a more refined interpretation of the weaker signals associated with die vibrations. In particular, a self-tuning (adaptive) filter, matched to the embedded sensor, is used to reconstruct the stimulus of the die vibrations to reveal otherwise non-measurable knock-out tonnage parameters from the strain signal output by the sensor. Necessary information is obtained by means of a suitable dynamics identification procedure. Information necessary for self-tuning is obtained by means of a suitable die-set dynamics identification procedure.

10 Claims, 5 Drawing Sheets

IN-DIE EJECTION FORCE MEASUREMENT IN FORMING OPERATIONS

REFERENCE TO RELATED APPLICATION

This application claims priority of U.S. provisional application Ser. No. 60/030,402, filed Oct. 21, 1996, the entire contents of which are incorporated herein by reference.

FIELD OF THE INVENTION

The present invention relates to measurement in forming process and, more particularly, to in-die apparatus and methods for determining knock-out tonnage.

BACKGROUND OF THE INVENTION

In forming processes utilizing dies, and the like, it is often advantageous to sense or measure stress or strain experienced by the die during the knock-out of the part being formed. The knock-out tonnage, as it is called, associated with part ejection, may be used to monitor and diagnose the process being used (i.e., part phoscoating), and die conditions (i.e., in-process assessment of progressive wear, cracking or spalling). Signals relating to knock-out tonnage are typically also indicative of the level of, or need for, sufficient lubrication to maximize service life.

The proposition to utilize conventional sensors in dies used in forming processes is not always straightforward. In typical die-sets, for example, there are no convenient or suitable methods to locate load sensors on the ejecting anvil or along the centerline of the die, due to the moving parts and signal transmission requirements, or the substantiality of the required sensors. Furthermore, the sensors themselves in such environments are required to withstand the shock loads and vibrations which occur on the moving parts and along the centerline of the die for extended periods of time.

Accordingly, the need remains for an alternative method of measuring ejection force in the dies in forming processes, which can either withstand or avoid the need to experience ejection tonnage directly, but rather, utilize an alternative approach to calculate or estimate the forces involved.

SUMMARY OF THE INVENTION

The present invention addresses the need for ejection tonnage measurement in dies in forming processes, through the use of an in-die sensor placed in the flux of the force caused by the ejection. A suitable location for the sensor can be, for example, a stationary part of the die, a die pot or a bolt attaching the die pot to the die shoe. In the proposed solution the sensor is exposed only to a part of the ejection induced forces, so its output signal is generally weaker and subject to noise, as compared with the sensor installed on the ejecting anvil. To compensate for this, signal filtering methods according to the invention are utilized for a more refined interpretation of the weaker signal.

In particular, it was observed by applying relatively high-frequency sampling (i.e., tens of kilohertz) that the in-die signal produced during knock-out was not a single spike attributable to the ejection tonnage, but rather, a complex waveform featured by strong oscillations. A self-tuning (adaptive) filter, matched to the embedded sensor, is used to reconstruct the stimulus, that is the otherwise non-measurable knock-out tonnage from the strain signal generated by the sensor. Necessary information is obtained by means of a suitable dynamics identification procedure.

DETAILED DESCRIPTION OF THE PREFERRED EMBODIMENT

As discussed in the Summary of the Invention, direct measurement of ejection tonnage in dies in forming processes presents practical problems in that suitable methods have not been developed to locate load sensors on the ejecting anvil or along the centerline of the die, due to the moving part and the robustness of the required sensors, which must withstand considerable shock and vibration during part knock-out. This invention mitigates this problem in at least two ways; firstly, by locating the sensor in the wall of the die that does not come in contact with the part or moving parts and, secondly, by providing a matched filter to self-tune the sensor, enabling a representative tonnage estimate to be extracted from the oscillations actually experienced by the sensor during part ejection.

Figure 1:
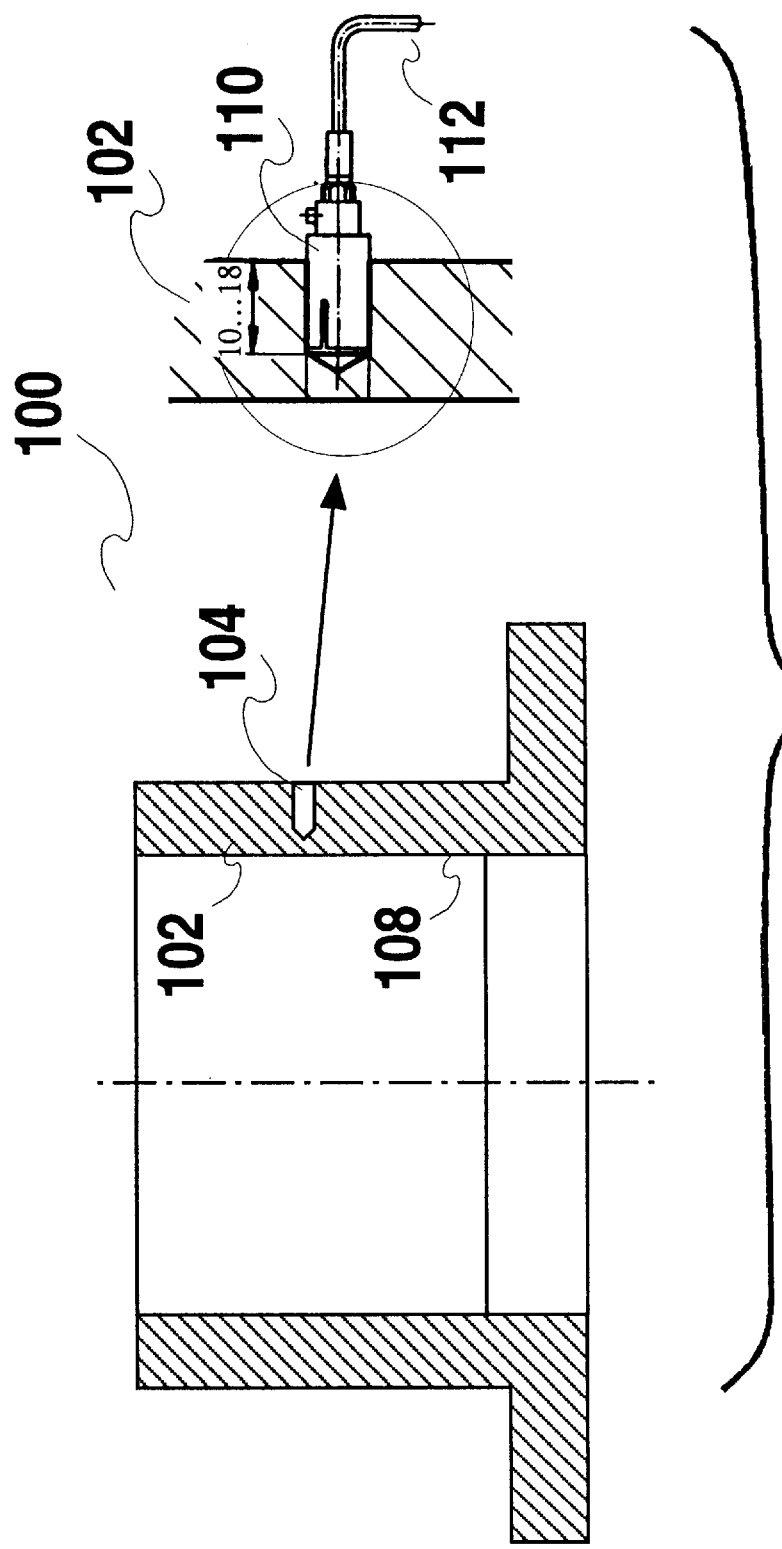
FIG. 1 is a two-part, cross-sectional drawing of a lower die pot section and a detail illustrating a possible sensor installation according to the invention.

FIG. 1 illustrates, in cross-section generally at 100, the lower section of a die pot having a wall 102, into which there is formed a cylindrical cavity or a hole 104. A detail of this cavity 104 is shown in the right-hand section of the two-part drawing of FIG. 1, further including the installation of a sensor 110 into the cavity 104. The sensor 110, which may be purchased commercially from Kistler, Inc., is a strain sensor, producing an output electrical signal through connector 112 which is indicative of the strain sensed by the transducer internal to the sensor body.

As mentioned, the signal obtained from the strain sensor embedded in the die is not readily suitable for the measurement of the knock-out tonnage. As shown in the bottom portion of FIG. 2, this signal looks erratic, and some of its features, such as the magnitude of a distinctive spike 204, does not provide a positive indication of the actual level of the knock-out tonnage.

Figure 2:
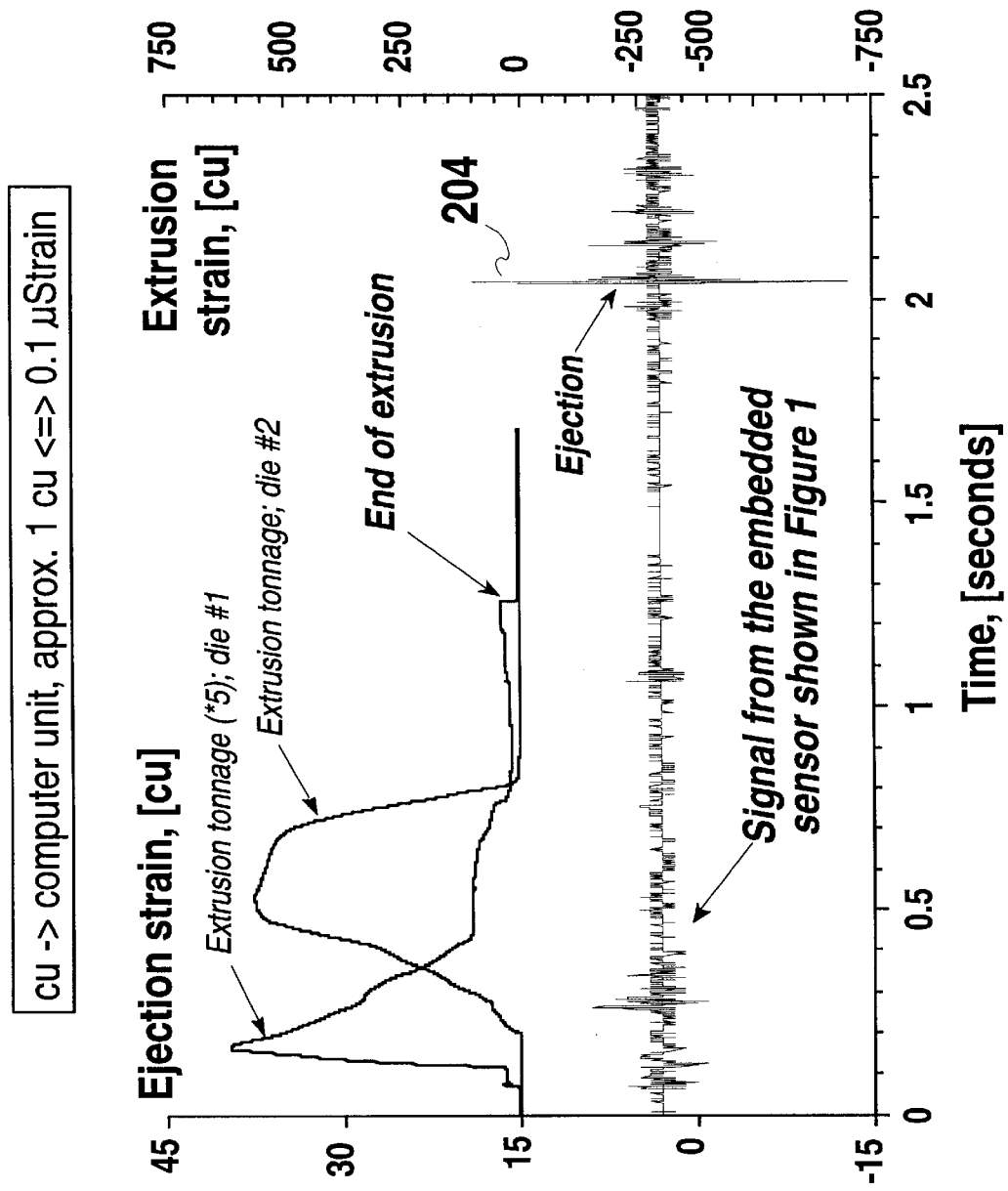
FIG. 2 is a graph used to illustrate extrusion and ejection tonnage signals measured by the embedded strain sensors.
Figure 3:
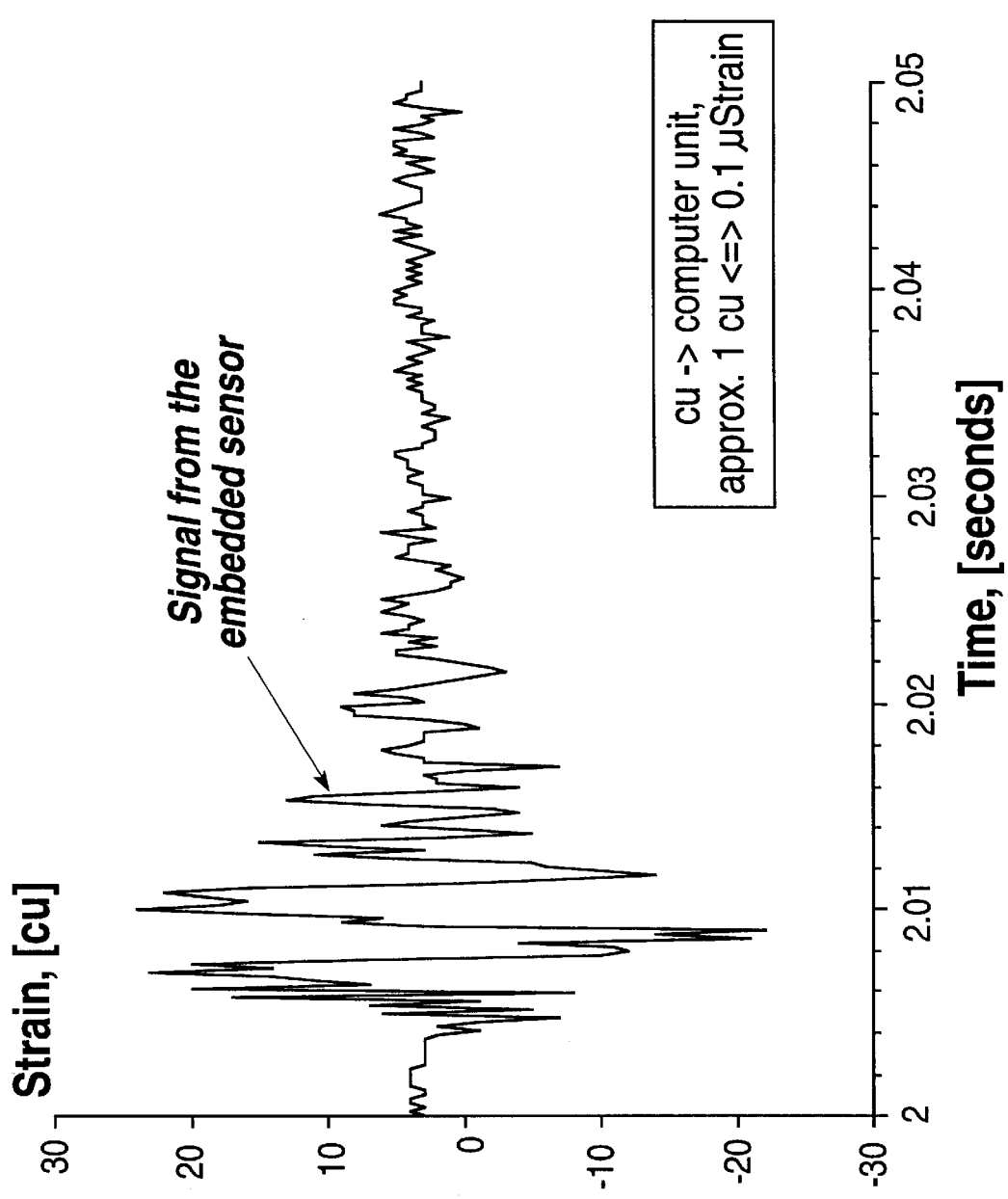
FIG. 3 is a graph illustrating an ejection tonnage signal expanded at the moment of the part knock-out.

FIG. 3 is a plot of strain versus time for the ejection spike 204 of FIG. 2, but with a relatively high sampling frequency (e.g., 20 kHz or higher) being used to record the strain signal in the close vicinity of the knock-out instance. High speed sampling reveals strong oscillations as opposed to a single spike 204 attributable to the ejection tonnage.

Figure 4:
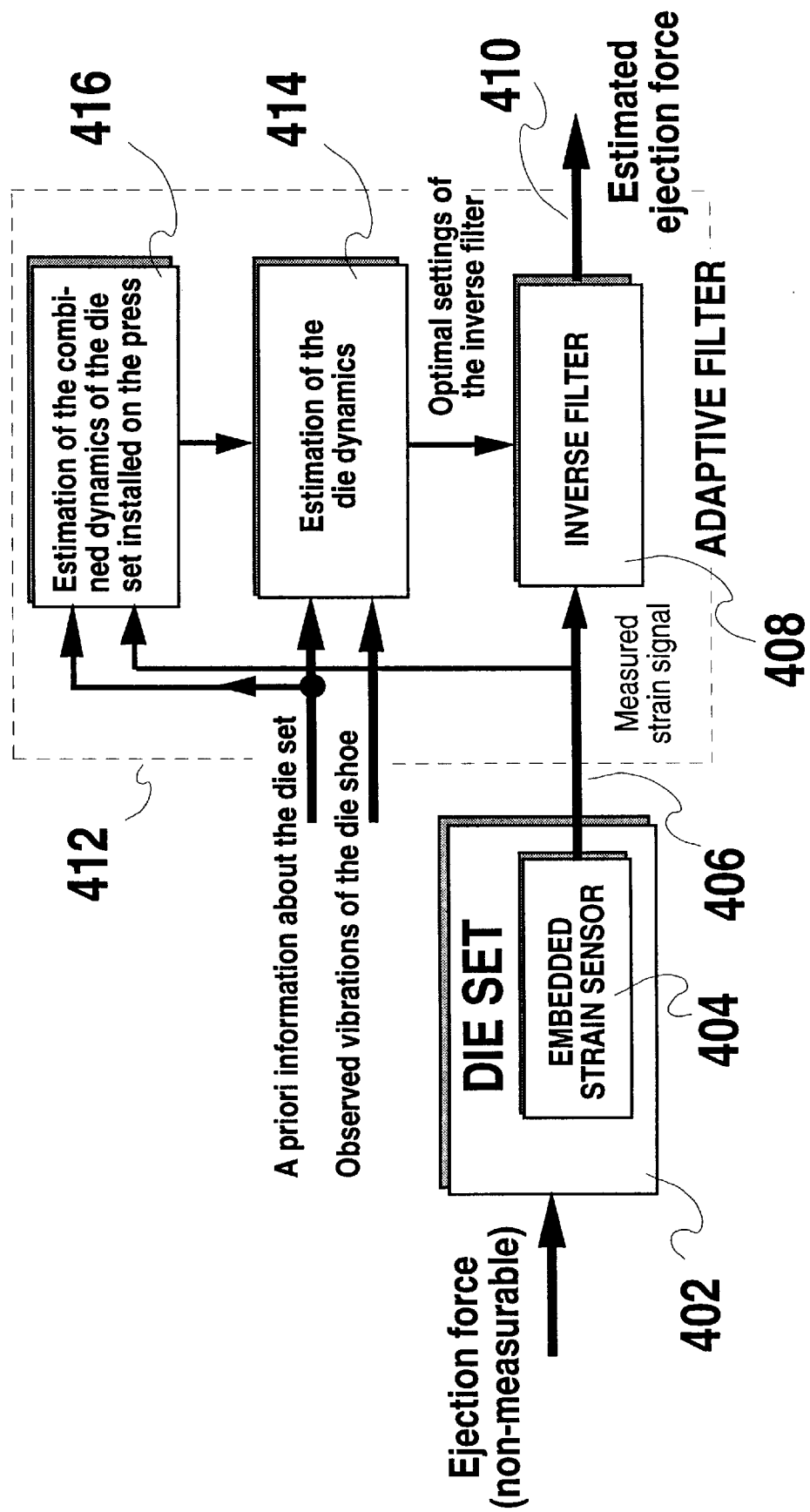
FIG. 4 is a block diagram depicting a self-tuning knock-out sensor hardware system aspect of the invention.

FIG. 4 shows, in a block-diagram form, major electrical functional units associated with an apparatus aspect of the invention. An ejection force, which is otherwise non-measurable, impacts a die set 402 having an embedded strain sensor 404, both of which are shown in schematic, block-diagram form. An electrical signal indicative of die set vibration, is output along path 406 as a measured but "raw" strain signal. This signal is fed at least to an inverse filter 408, which reconstructs the stimulus of the die vibrations, that is, the non-measurable knock-out tonnage. The reconstructed stimulus is the output along path 410 as an estimated ejection force.

In a preferred embodiment, the inverse filter 408 forms part of a more comprehensive adaptive filter, shown in broken lines 412, which includes means 414 for estimating die dynamics, and means 416 for estimating the combined dynamics of the die set installed on the particular press. In this more robust configuration, the measured strain signal along path 406 is also fed to block 416 along with a priori information as to the die set, to produce an estimate of the combined dynamics of the die set installed on the press along path 418. This a priori information is also fed to block 414 along with observed vibrations of the die shoe, which forms part of the die set, which, together with the information received along path 418, is used to provide an estimate of die dynamics. These die dynamics are converted to optimal settings for the inverse filter, 408, and then fed along path 420 to the inverse filter 408. The information obtained through the use of the dynamic identification procedure just described, or a suitable alternative, enables the filter to be self-tuning or adaptive, and matched with the embedded sensor.

Figure 5:
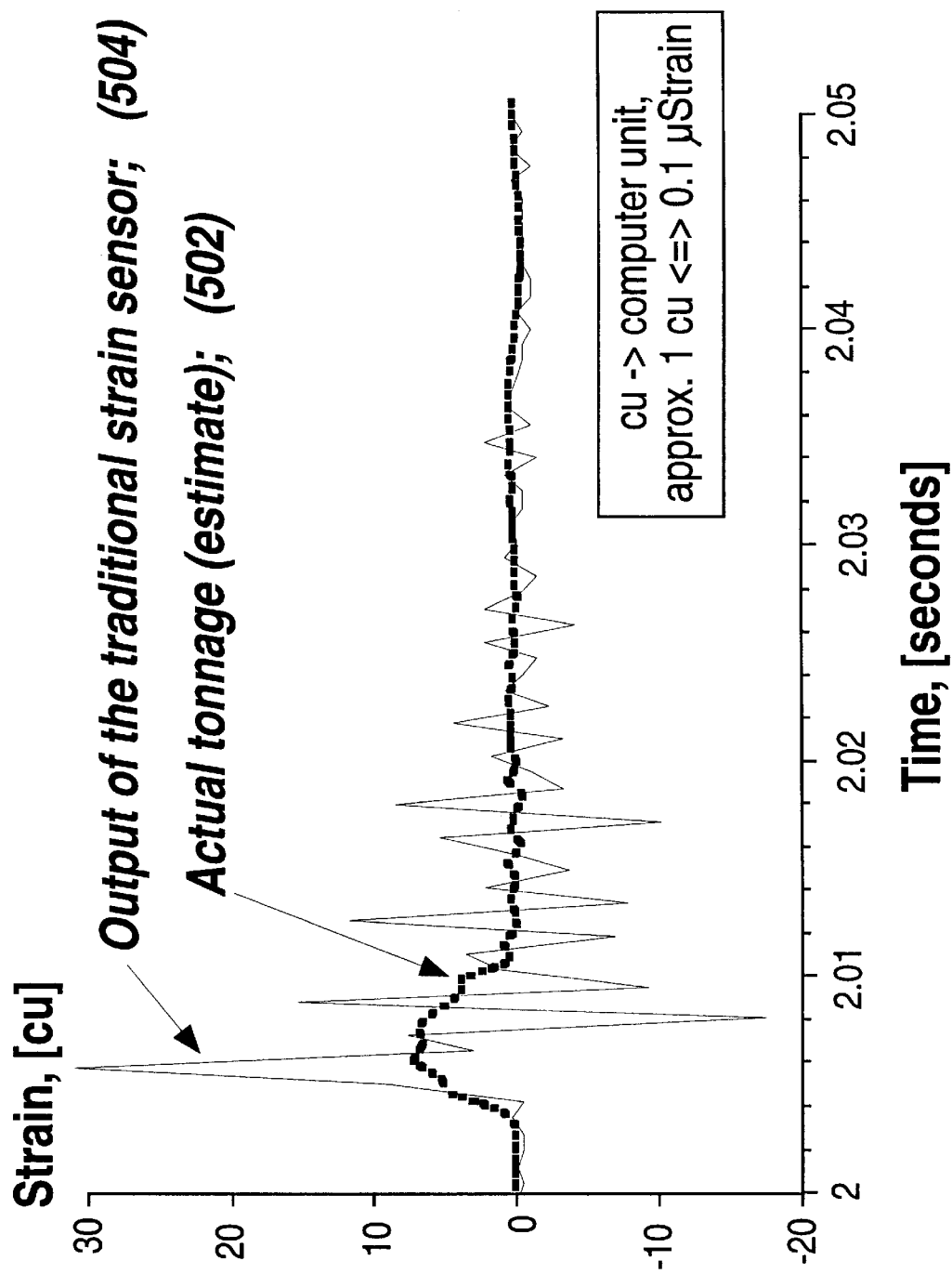
FIG. 5 is a graph comparing an ejection tonnage signal obtained directly from the strain sensor, and an actual tonnage estimate made possible by the self-tuning sensor of this invention.

As shown in FIG. 5, the use of a self-tuning adaptive filter matched to the embedded sensor according to this invention allows an estimate of actual tonnage (curve 502) to be extracted from the output of the traditional strain sensor, as shown by the more jagged oscillatory curve of 504. Note that the actual tonnage estimate signal 502 has a regular shape, required for characterization of knock-out tonnage. This signal is suitable for monitoring and diagnosis of the process at hand, (for example, part phoscoating) and die condition monitoring (for example, in-process assessment of progressive wear, cracking or spalling).

That claimed is:

1. A method of estimating the non-measurable knock-out tonnage associated with the ejection of a part from a die set, the method comprising the steps of:

embedding a strain or force sensor in a suitable component of the die set in the flux of the force induced by the part knock-out, the sensor outputting an electrical signal which is proportional to the strain or force caused by the knock-out tonnage;

passing the electrical signal to an inverse filter, whose function is to reconstruct a time profile of the knock-out tonnage causing the actual instantaneous die strain or force measured by the sensor; and scaling the reconstructed form to obtain an accurate estimate of the non-measurable knock-out tonnage.

2. The method of claim 1, further including the step of:

sampling the electrical signal from the sensor at a rapid rate as the part is ejected from the die.

3. The method of claim 1, further including the steps of:

utilizing information as to the physical characteristics of the die set; and self-tuning the filter in accordance with the physical characteristics of the die set and press.

4. The method of claim 3, further including the steps of:

estimating die dynamics based upon the received information; and wherein:

the self-tuning of the filter includes the step of determining optimal settings for the inverse filter in accordance with the estimated die dynamics.

5. Apparatus for determining the non-measurable knock-out tonnage associated with the ejection of a part from a die set forming part of a multi-body dynamic system on a forming press, the apparatus comprising:

a strain or force sensor adapted to be embedded into the die set, the sensor when so embedded outputting an electrical signal which is proportional to the strain or force in the multi-body dynamic system formed by the die set resulting from the knock-out tonnage; and an inverse filter connected to receive the electrical signal from the embedded sensor, the filter being operative to convert the die set strain or force fluctuations associated with the ejection of the part into the actual non-measurable knock-out tonnage.

6. The apparatus of claim 5, wherein the inverse filter forms part of an adaptive filter, the adaptive filter further including:

means for receiving information about the die set; and means for estimating die dynamics of die set in accordance with the information received about the die set mechanical structure and the measured strain or force signal; and wherein:

the adaptive filter is self-tuning to provide optimal settings for the inverse filter.

7. The method of claim 6, further including:

means to receive the electrical signal from the strain or force sensor, for estimating the effective dynamics of the die set installed on the forming press.

8. A system for determining knock-out tonnage from a a signal measured at a suitable component of the die set comprising:

a die set;

a strain or force sensor embedded in the die set, the sensor outputting an electrical signal which is proportional to strain or force present in the component of the die set during operation; and an inverse filter connected to receive the electrical signal from the sensor, the filter being operative to reconstruct the time profile of knock-out tonnage causing variations the measured signal associated with the ejection of the part and output a signal representative of knock-out tonnage.

9. The system of claim 8, wherein the inverse filter forms part of an adaptive filter, the adaptive filter further including:

means for receiving information about the die set; and means for estimating the effective dynamics of the die set in accordance with the information received about the die set; and wherein the adaptive filter is self-tuning to provide optimal settings for the inverse filter.

10. The system of claim 9, further including:

means to receive the electrical signal from the sensor embedded in the die set, for estimating the effective dynamics of the die set installed on the forming press.

* * * * *